(12) United States Patent
Mercier et al.

(10) Patent No.: US 9,626,569 B2
(45) Date of Patent: Apr. 18, 2017

(54) FILTERED IMAGE DATA RECOVERY USING LOOKBACK

(71) Applicant: BAE Systems Information And Electronic Systems Integration Inc., Nashua, NH (US)

(72) Inventors: Michael N. Mercier, Nashua, NH (US); Joseph M. Schlupf, Newburyport, MA (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 48 days.

(21) Appl. No.: 14/932,490

(22) Filed: Nov. 4, 2015

(65) Prior Publication Data

US 2016/0132499 A1      May 12, 2016

Related U.S. Application Data

(60) Provisional application No. 62/076,293, filed on Nov. 6, 2014.

(51) Int. Cl.
*G06K 9/00* (2006.01)
*G08B 13/196* (2006.01)
*H04N 5/232* (2006.01)

(52) U.S. Cl.
CPC ...... *G06K 9/00711* (2013.01); *G08B 13/1961* (2013.01); *G06K 2009/00738* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 2010/0283852 A1* | 11/2010 | Caber | F41G 7/007 348/144 |
| 2016/0335504 A1* | 11/2016 | Midavaine | G06K 9/00624 |
| 2016/0358026 A1* | 12/2016 | Le Croller | G06K 9/00973 |

\* cited by examiner

*Primary Examiner* — Justin P Misleh
(74) *Attorney, Agent, or Firm* — McCarter & English, LLP (57) ABSTRACT

Methods and systems for filtered image data recovery using lookback include storing first, second, and third data captures received from the image sensor in a first memory component and a second memory component. The methods and systems also include identifying a second detection in the second data capture and a third detection in the third data capture by filtering the first, second, and third data captures. The second detection and the third detection each exceed a pixel intensity threshold. The methods and systems also include correlating the second detection and the third detection to identify at least one track. The methods and systems also include detecting a first detection in the first data capture stored in the second memory component, the first detection being a pixel intensity value that is less than the threshold or an initiation event having a pixel intensity value that is less than the threshold.

20 Claims, 7 Drawing Sheets

FILTERED IMAGE DATA RECOVERY USING LOOKBACK

RELATED APPLICATION

This application claims the benefit of, and priority to, U.S. provisional patent application Ser. No. 62/076,293, filed Nov. 6, 2014, which is incorporated herein by reference in its entirety.

BACKGROUND

Image sensor systems are often used in threat detection systems. Such systems, in order to conserve one or more of power supply resources, memory resources, or processing resources, are configured to filter substantial portions of image data received from the image sensors. Conventionally, such systems initially filter image data based on one or more pixel intensity thresholds within a field of view (FOV) of the image sensor system. Such thresholds are a highly efficient way of reducing high volumes of data received from the image sensor(s) of the system that need to be processed.

SUMMARY

In one embodiment. a method for filtered image data recovery is provided. The method includes receiving, at a first computing device having a first memory component and a first processing component, first, second, and third data captures from an image sensor, the first data capture including a first plurality of pixel intensity values, the second data capture including a second plurality of pixel intensity values, and the third data capture including a third plurality of pixel intensity values. The method also includes storing the first, second, and third data captures received from the image sensor in the first memory component. The method also includes receiving, at a second computing device having a second memory component and a second processing component, the first, second, and third data captures from the image sensor. The method also includes storing the first, second, and third data captures received from the image sensor in the second memory component. The method also includes identifying at least a second detection in the second data capture and a third detection in the third data capture by filtering the first, second, and third data captures, the filtering performed using the first processing component to determine at least one of the second plurality of pixel intensity values of the second data capture and at least one of the third plurality of pixel intensity values of the third data capture exceeds a pixel intensity threshold stored in the first memory component. The method also includes correlating, by the first processing component, the second detection and the third detection to identify at least one track. The method also includes detecting a first detection in the first data capture stored in the second memory component, the detecting performed based on the identification of the at least one track and using the second processing component of the second computing device, the first detection being at least one of a pixel intensity value that is less than the pixel intensity threshold or an initiation event having a pixel intensity value that is less than the pixel intensity threshold.

In another embodiment an imaging system is provided. The system includes an image sensor configured to capture image data. The system also includes a first computing device in electronic communication with the image sensor having a first memory component and a first processing component. The first memory component includes instructions that, when executed by the first processing component, cause the first computing device to receive first, second, and third data captures from the image sensor, the first data capture including a first plurality of pixel intensity values, the second data capture including a second plurality of pixel intensity values, and the third data capture including a third plurality of pixel intensity values. The first memory component also includes instructions that, when executed by the first processing component, cause the first computing device to store the first, second, and third data captures received from the image sensor in the first memory component. The first memory component also includes instructions that, when executed by the first processing component, cause the first computing device to identify at least a second detection in the second data capture and a third detection in the third data capture by filtering the first, second, and third data captures, the filtering performed using the first processing component to determine at least one of the second plurality of pixel intensity values of the second data capture and at least one of the third plurality of pixel intensity values of the third data capture exceeds a pixel intensity threshold stored in the first memory component. The first memory component also includes instructions that, when executed by the first processing component, cause the first computing device to correlate, by the first processing component, the second detection and the third detection to identify at least one track.

The system also includes a second computing device in electronic communication with the image sensor and the first computing device having a second memory component and a second processing component. The second memory component includes instructions that, when executed by the second processing component, cause the second computing device to receive the first, second, and third data captures from the image sensor. The second memory component also includes instructions that, when executed by the second processing component, cause the second computing device to store the first, second, and third data captures received from the image sensor in the second memory component. The second memory component also includes instructions that, when executed by the second processing component, cause the second computing device to detect a first detection in the first data capture stored in the second memory component, the detecting performed based on the identification of the at least one track and using the second processing component of the second computing device, the first detection being at least one of a pixel intensity value that is less than the pixel intensity threshold or an initiation event having a pixel intensity value that is less than the pixel intensity threshold.

In another embodiment, another imaging system is provided. The system includes an image sensor configured to capture image data. The system also includes a computing device in electronic communication with the image sensor having first and second memory components and a processing component. The first memory component includes instructions that, when executed by the processing component, cause the computing device to receive first, second, and third data captures from the image sensor, the first data capture including a first plurality of pixel intensity values, the second data capture including a second plurality of pixel intensity values, and the third data capture including a third plurality of pixel intensity values. The first memory component also includes instructions that, when executed by the processing component, cause the computing device to store the first, second, and third data captures received from the image sensor in the first memory component. The first memory component also includes instructions that, when executed by the processing component, cause the computing device to store the first, second, and third data captures received from the image sensor in the second memory component. The first memory component also includes instructions that, when executed by the processing component, cause the computing device to identify at least a second detection in the second data capture and a third detection in the third data capture by filtering the first, second, and third data captures, the filtering performed using the processing component to determine at least one of the second plurality of pixel intensity values of the second data capture and at least one of the third plurality of pixel intensity values of the third data capture exceeds a pixel intensity threshold stored in the first memory component. The first memory component also includes instructions that, when executed by the processing component, cause the computing device to correlate the second detection and the third detection to identify at least one track. The first memory component also includes instructions that, when executed by the processing component, cause the computing device to detect a first detection in the first data capture stored in the second memory component, the detecting performed based on the identification of the at least one track, the first detection being at least one of a pixel intensity value that is less than the pixel intensity threshold or an initiation event having a pixel intensity value that is less than the pixel intensity threshold.

BRIEF DESCRIPTION OF THE DRAWINGS

The accompanying drawings which are incorporated in and constitute a part of this specification, illustrate one or more embodiments of the invention and, together with the description, help to explain the invention. The drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

While the use of pixel intensity thresholds in image sensor systems is useful in reducing acquired image data to manageable amounts, setting such thresholds too low results in over-consumption of the power supply resources, memory resources, or processing resources, thereby reducing or eliminating image sensor system performance capabilities (e.g., due to an overloaded processor, full memory, or dead battery). Conversely, setting such thresholds too high results in excessive missed content, thereby reducing image sensor system performance (e.g., resulting in failing to detect a threat launch, failing to track a previously launched threat, or failing to provide a threat warning). Furthermore, even where thresholds are set at optimum levels, some content can be missed depending on image background conditions, the range to target, or other factors.

Methods and systems of the present invention teach filtered image data recovery using a 'lookback' approach for handling data acquired by an image sensor system. In accordance with various embodiments, a series of data captures (frames) from an image sensor are stored in duplicate in first and second memory components of one or more computing devices. Each of the frames includes multiple pixel intensity values. Embodiments use a first processing component of a first one of the computing devices to filter the pixel intensity values of each of the frames using a pixel intensity threshold filter to identify any pixel intensity values exceeding the pixel intensity threshold as detections. Pixel intensity threshold, as used herein, can refer to, for example, a pixel intensity magnitude threshold that sets a minimum pixel intensity value such that a pixel intensity value exceeding the minimum pixel intensity value is indicated to be a detection, a temporal pixel intensity difference threshold defined as a minimum change in pixel intensity value over a preset time period, wherein a change in pixel intensity value exceeding the minimum change is indicated to be a detection, a spectrum-specific pixel intensity magnitude threshold, a spectrum-specific temporal pixel intensity difference threshold, or combinations thereof. Any pixel intensity values that do not exceed the pixel intensity threshold are discarded from the first memory component to reduce the quantity of data that needs to be processed. However, the frames stored in the second memory component are kept in their raw, unfiltered state. Thus, the initial, coarse filtering provided by the pixel intensity thresholds rapidly reduces the quantity of image data stored in the first memory component prior to further processing while at the same time temporarily maintaining the image data in the second memory component.

The identified detections (i.e., the pixels in the image data whose intensity values exceed the threshold) are then correlated between at least two frames to identify or confirm one or more tracks (e.g., flight paths of a rocket, missile, shell, anti-aircraft fire, ordinance, or other threat traveling within range of the image sensor). Any detections not associated with one of the tracks can then be discarded. However, the frames stored in the second memory component continue to remain for a time in their raw, unfiltered state where they can be reviewed again if necessary as explained further below. Thus, the moderate filtering provided by the track correlation further reduces the quantity of relevant data in the first memory component, focusing any analysis on identified, tracked threats.

In response to identifying or confirming the one or more tracks, embodiments may use the first processing component or an additional processing component to perform a more intensive lookback analysis using the raw image data stored in the second memory component on at least a portion of each consecutively previous frame in the series to follow the track "in reverse" until an initiation event is detected. For example, the lookback may be performed using image data from the second memory component that failed to meet the pixel intensity threshold. Initiation events that may be detected may be a rocket launch, a muzzle flash, a missile launch, another type of threat, or some combination thereof. Accordingly, through the use of the lookback approach described herein, embodiments provide effective filtering of noise or other irrelevant image data using a relatively high pixel intensity threshold while still maintaining the capability to recover initiation event data that would have otherwise been discarded. Advantageously, backward looking completion of the threat track and recovery of the initiation event data allows the systems and methods to identify a type of the tracked threat, a range of the tracked threat, a speed of the tracked threat, and/or a launch location of the tracked threat for later neutralization or avoidance, or combinations thereof.

Figure 1:
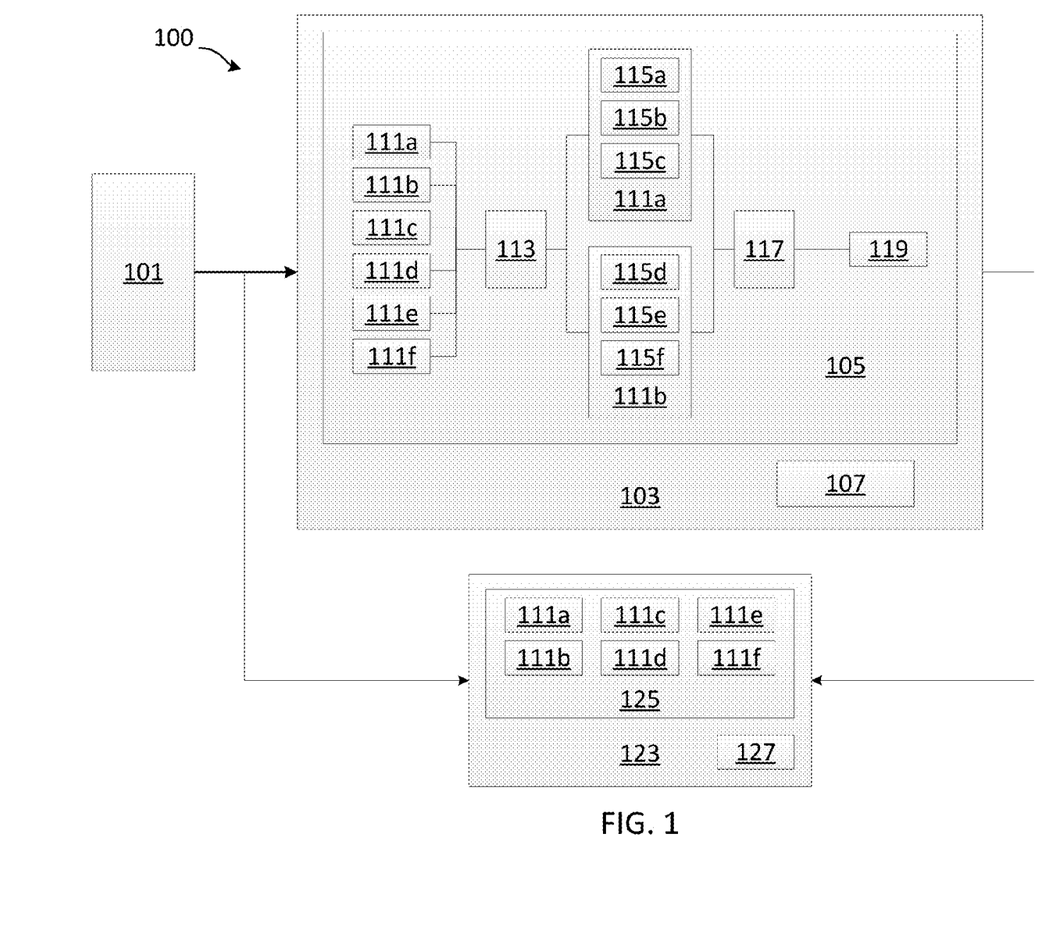
FIG. 1 is a block diagram showing a system for filtered image data recovery using lookback in accordance with various embodiments taught herein.

Referring now to FIG. 1, an imaging system 100 for filtered image data recovery using lookback includes an image sensor 101 configured to capture image data in discrete data captures (frames) 111a-f over time. The system 100 also includes a first computing device 103 having a first processing component 107 and a first memory component 105. The first computing device 103 is configured to receive the frames 111a-f from the image sensor 101 and store the frames 111a-f in the first memory component 105. The system 100 also includes a second computing device 123 having a second processing component 127 and a second memory component 125. The second computing device 103 is configured to receive the frames 111a-f from the image sensor 101 and store the frames 111a-f in the second memory component 125. As illustrated by FIG. 1, frame 111a is the most recent and frame 111f is the least recent of a consecutive series of frames 111a-f. Each of the frames 111a-f includes corresponding pixel intensity values recorded within the field of view of the image sensor 101.

Image sensor 101, in accordance with various embodiments, can be any suitable device such as, for example, but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that the image sensor 101, in accordance with various embodiments can encompass any sensor configured to capture electromagnetic radiation in any spectrum for producing an image, including, for example, infrared radiation, visible light, ultraviolet radiation, x-rays, etc. In use, in accordance with various embodiments, the image sensor 101 records data captures (frames) over time. The data associated with each frame can include spectral data (i.e., frequency of the received radiation) and intensity data (i.e., amplitude of the received radiation) for each pixel of the image sensor 101. The frame and associated data is then transmitted to or retrieved by the first and second computing devices 103, 123.

First and second computing devices 103, 123 in accordance with various embodiments, can include one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable devices capable of including at least one of the processing components 107, 127 and at least one of the memory components 105, 125, or combinations thereof. The first and second processing components 107, 127 of the first and second computing systems 103, 123 can include one or more logic blocks, logic gates, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. The first and second memory components 105, 125 can include a computational device memory or random access memory, such as DRAM, SRAM, EDO RAM, and the like as well as, for example, flip-flops, memory blocks, RAM blocks, programmable read-only memory, any other suitable type of digital or analog memory, or combinations thereof.

The first computing device 103 is also configured to filter each of the frames 111a-f by applying a pixel intensity threshold 113 to identify one or more pixel intensity values exceeding the pixel intensity threshold 113 as detections 115a-f within each frame. For example, detections 115a-c are identified within frame 111a and detections 115d-f are identified within frame 111b. Pixel intensity values that fail to exceed the pixel intensity threshold 113 are then discarded from the first memory component 105. It should be appreciated that the use of the threshold with respect to discarding an individual pixel intensity value from the first memory component may vary depending upon implementation without departing from the scope of the present invention. For example, in one implementation the pixel intensity value may need to exceed the threshold value in order to remain in the first memory component while in another implementation pixel values that equal or exceed the intensity threshold value may remain in the first memory component In one embodiment, the first computing device 103 is also configured to determine a track correlation 117 to identify (or establish or confirm) one or more detections as forming a track 119.

In response to identification of the track 119, the first processing component 107 of the first computing device 103 can instruct the second processing component 127 of the second computing device 123 to look back, sequentially, at the prior unfiltered frames (e.g., 111c-f as shown) to identify any detections associated with the track that were within the pixel intensity threshold 113 in the prior frames 111c-f (for example detections that were below the pixel intensity threshold due to range, camouflage, background conditions, etc.) until either the track is lost or an initiation event is detected.

Figure 2:
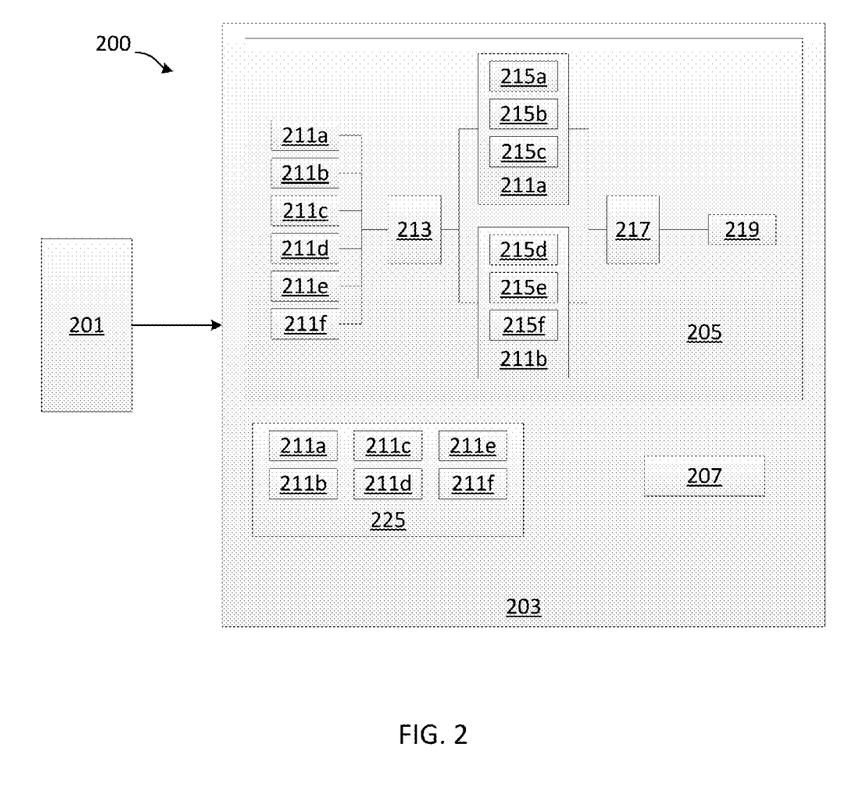
FIG. 2 is a block diagram showing another system for filtered image data recovery using lookback in accordance with various embodiments taught herein.

FIG. 2 depicts another imaging system 200 for filtered image data recovery using lookback using a single computing device 203. The system 200 includes an image sensor 201 configured to capture image data in a plurality of discrete data captures (frames) 211a-f over time. The system 200 also includes a computing device 203 having a processing component 207, a first memory component 205, and a second memory component 225. The computing device 203 is configured to receive the plurality of frames 211a-f from the image sensor 201 and store the frames 211a-f, in duplicate, in the first memory component 205 and the second memory component 225. As illustrated by FIG. 2, frame 211a is the most recent and frame 211f is the least recent of a consecutive series of frames 211a-f. Each of the plurality of frames 211a-f includes a corresponding plurality of pixel intensity values recorded within the field of view of the image sensor 201.

Image sensor 201, in accordance with various embodiments, can be any suitable device such as, for example, but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that the image sensor 201, in accordance with various embodiments can encompass any sensor configured to capture electromagnetic radiation in any spectrum for producing an image, including, for example, infrared radiation, visible light, ultraviolet radiation, x-rays, etc. In use, in accordance with various embodiments, the image sensor 201 records a plurality of data captures (frames) over time. The data associated with each frame can include spectral data (i.e., frequency of the received radiation) and intensity data (i.e., amplitude of the received radiation) for each pixel of the image sensor 201. The frame and associated data is then transmitted to or retrieved by the computing device 203.

The computing device 203 in accordance with various embodiments, can include one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable devices capable of including the processing component 207 and the first and second memory components 205, 225, or combinations thereof. The processing component 207 of the computing system 203 can include one or more logic blocks, logic gates, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. The first and second memory components 205, 225 can include a computational device memory or random access memory, such as DRAM, SRAM, EDO RAM, and the like as well as, for example, flip-flops, memory blocks, RAM blocks, programmable read-only memory, any other suitable type of digital or analog memory, or combinations thereof.

The computing device 203 is also configured to filter each of the plurality of frames 211a-f by applying a pixel intensity threshold 213 to identify one or more pixel intensity values exceeding the pixel intensity threshold 213 as detections 215a-f within each frame. For example detections 215a-c I are dentified within frame 211a and detections 215d-f are identified within frame 211b. Pixel intensity values that are within the pixel intensity threshold 213 are then discarded from the first memory component 205. The computing device 203 is also configured to apply a track correlation 217 to identify (or establish or confirm) one or more detections as forming a track 219.

In response to identification of the track 219, the processing component 207 looks back, sequentially, at the prior unfiltered frames (e.g., 211c-f as shown) to identify any detections associated with the track that, due to, for example, range, camouflage, background conditions, etc., were within the pixel intensity threshold 213 in the prior frames 211c-f until either the track 219 is lost or an initiation event is detected.

The initiation event can be, for example, a rocket launch, a muzzle flash, a missile launch, any other threat initiation, or combinations thereof. Accordingly, the system 200, by use of the lookback, can provide effective filtering of noise or other irrelevant data by use of a relatively high pixel intensity threshold while still maintaining capability to recover initiation event data that would have otherwise been discarded. Advantageously, backward looking completion of the threat track and recovery of the initiation event data allows the systems and methods to identify a type of the tracked threat, a range of the tracked threat, a speed of the tracked threat, a launch location of the tracked threat for later neutralization or avoidance, or combinations thereof for providing enhanced threat avoidance and countermeasure response.

Figure 3:
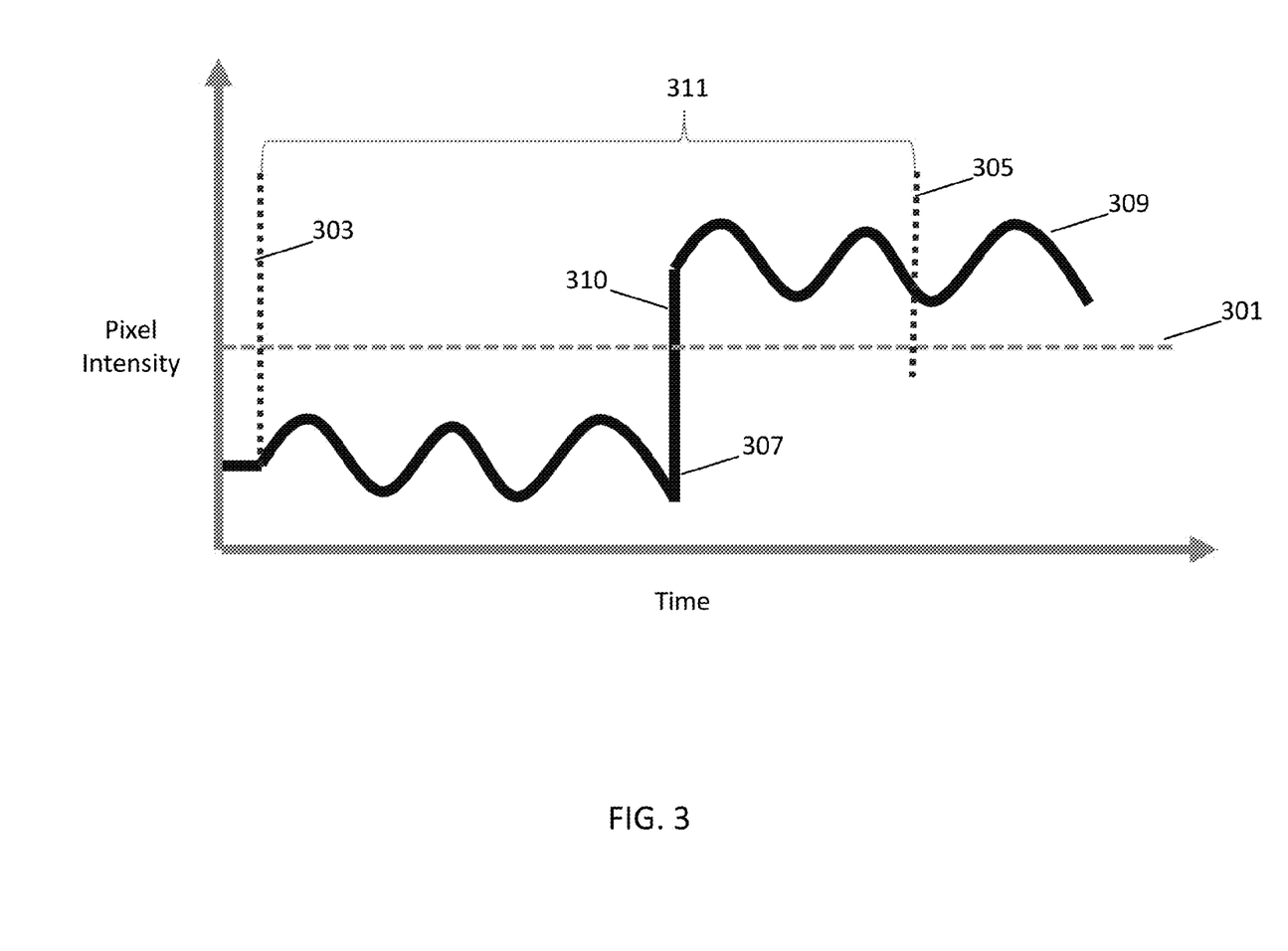
FIG. 3 is a plot of pixel intensity relative to a detection threshold over time in accordance with various embodiments taught herein.

FIG. 3 is an exemplary plot of pixel intensity relative to a pixel intensity threshold 301 over time (i.e., over multiple frames) in accordance with various embodiments of methods and systems for filtered image data recovery using lookback. As illustrated by FIG. 3, an undetected signal 307 having a pixel intensity value within the threshold 301 commences at an initiation event 303. At detection point 310, the undetected signal 307 reaches a greater pixel intensity value than the pixel intensity threshold 301, thus commencing a detected signal 309. The detected signal 309 is tracked for a period of time until a track is identified (confirmed) at track establishment point 305. The system then commences lookback 311, in response to reaching track establishment point 305, reviewing prior frames and recapturing data associated with the undetected signal 307 and the initiation event 303.

Figure 4:
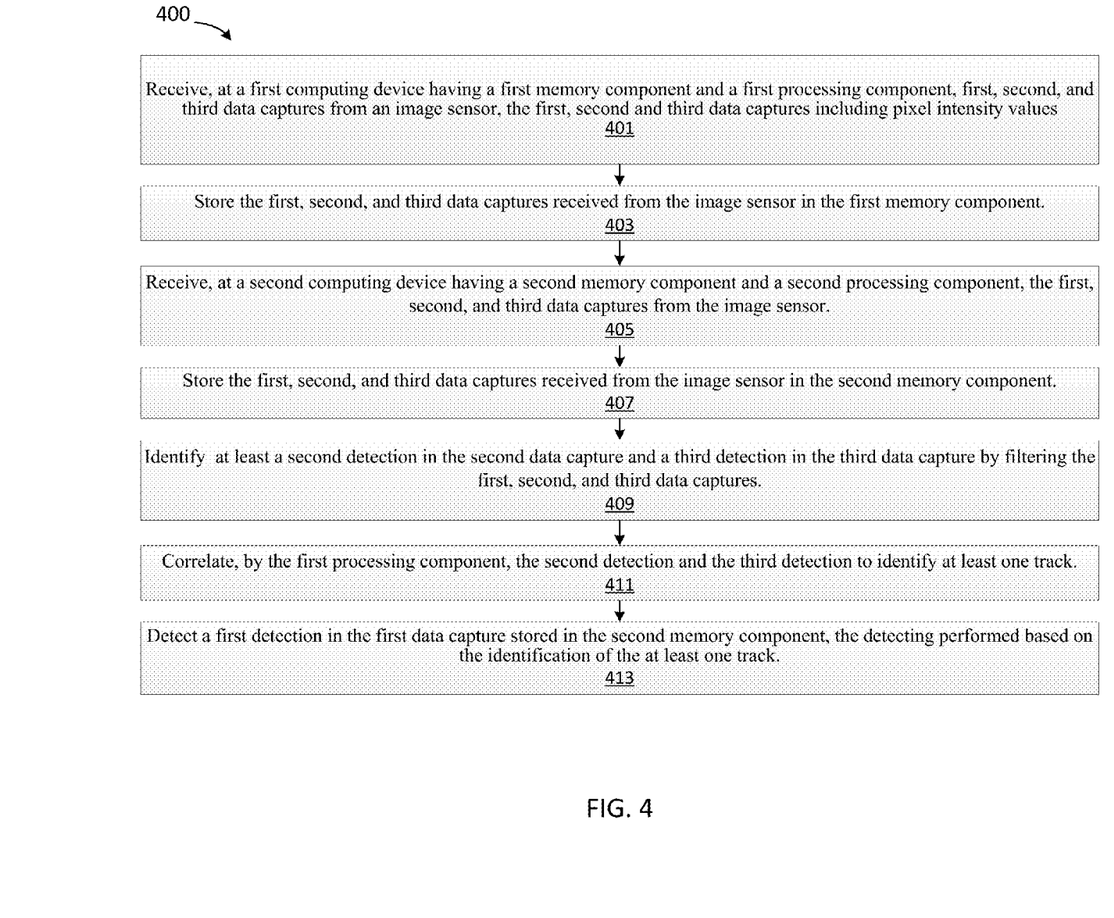
FIG. 4 is a flow chart illustrating a method for filtered image data recovery using lookback in accordance with various embodiments taught herein.

Referring now to FIG. 4, an exemplary method 400 includes a sequence of steps for performing filtered image data recovery using lookback in an embodiment of the system. The method includes a step 401 of receiving, at a first computing device having a first memory component and a first processing component, first, second, and third data captures from an image sensor. The first, second and third data captures include pixel intensity values associated with corresponding pixels. The first, second, and third data captures received from the image sensor are stored in the first memory component in step 403. At step 405, the first, second, and third data captures from the image sensor are received at a second computing device having a second memory component and a second processing component. The first, second, and third data captures received from the image sensor in the second memory component are stored in step 407. At step 409 at least a second detection in the second data capture and a third detection in the third data capture are identified by filtering the first, second, and third data captures using the first processing component. The filtering is performed by determining that at least one of the pixel intensity values of the second data capture and at least one of the pixel intensity values of the third data capture exceeds a pixel intensity threshold stored in the first memory component. The second detection and the third detection are correlated to identify at least one track in step 411. In step 413 a first detection is detected in the first data capture stored in the second memory component based on the identification of the at least one track. The second processing component of the second computing device analyzes the pixel intensity values of the first data capture stored in the second memory component to detect at least one of a first detection having a pixel intensity value that is less than the pixel intensity threshold or an initiation event having a pixel intensity value that is less than the pixel intensity threshold.

The step 401 of receiving the first, second, and third data captures from an image sensor can be performed, for example, but is not limited to, using the image sensor 101 and the first computing device 103 as described above with reference to FIG. 1. The step 403 of storing the first, second, and third data captures received from the image sensor in the first memory component can be performed, for example, but is not limited to, using the image sensor 101 and the first memory component 105 of the first computing device 103 as described above with reference to FIG. 1.

The step 405 of receiving, at a second computing device the first, second, and third data captures from the image sensor can be performed, for example, but is not limited to, using the image sensor 101 and the second computing device 123 as described above with reference to FIG. 1. The step 407 of storing the first, second, and third data captures received from the image sensor in the second memory component can be performed, for example, but is not limited to, using the image sensor 101 and the second memory component 125 of the second computing device 123 as described above with reference to FIG. 1.

The step 409 of identifying the second and third detections can be performed, for example, but is not limited to, using the processing component 107 of the first computing device 103 having the first memory component 105 to apply a pixel intensity threshold 113 to pixel intensity values of each of the frames 111a-f to identify one or more detections 115a-f as described above with reference to FIG. 1. The step 411 of correlating, by the first processing component, the second detection and the third detection to identify at least one track can be performed, for example, but is not limited to, using the first processing component 107 of the first computing device 103 having the first memory component 105 to apply a track correlation 117 to the detections 115a-f to identify one or more tracks 119 as described above with reference to FIG. 1.

The step 413 of detecting a first detection in the first data capture stored in the second memory component, the detecting performed based on the identification of the at least one track and using the second processing component of the second computing device can be performed, for example, but is not limited to, using the second processing component 127 of the second computing device 123 having the second memory component 125 to identify at least one of a pixel intensity value of one of the frames 111a-f that is less than the pixel intensity threshold 113 or an initiation event within one of the frames having a pixel intensity value that is less than the pixel intensity threshold 113.

Exemplary Distributed Imaging Systems

Figure 5:
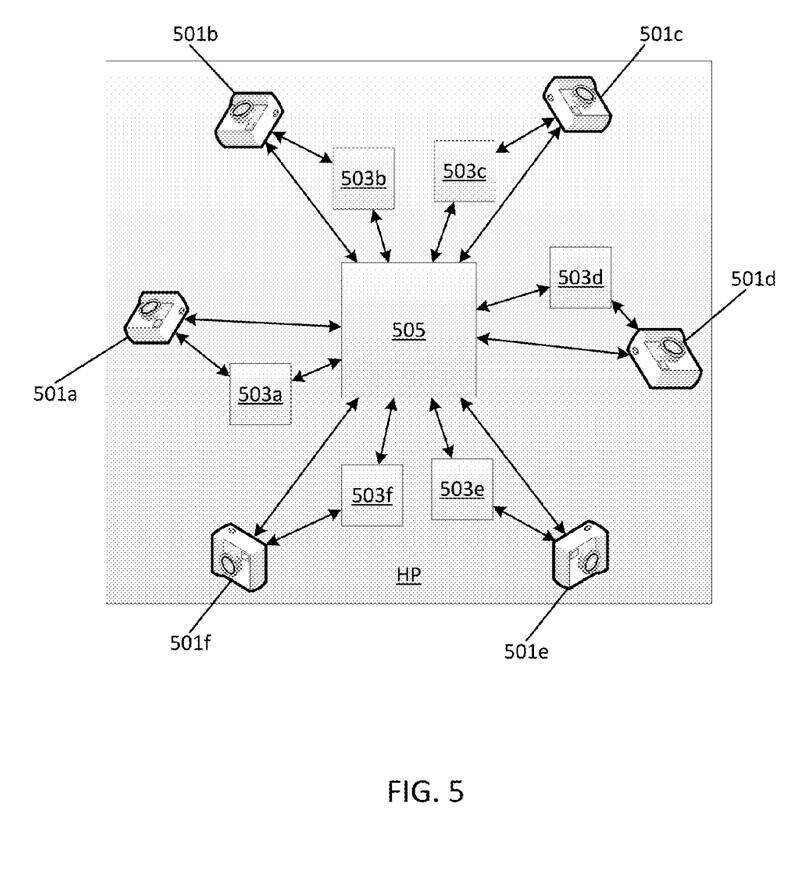
FIG. 5 is an example imaging system block diagram depicting various components which can be used to implement various embodiments in a distributed on-board imaging system as taught herein.

FIG. 5 is an example imaging system block diagram of an exemplary distributed on-board imaging system 500. The on-board imaging system 500 can be installed on a host platform (HP). The HP may be, for example, a helicopter, aircraft, drone, ship, boat, vessel, tank, truck, motor vehicle, any other suitable mobile host platform, or combinations thereof. The system 500 includes image sensors 501a-f installed on the HP, each of the image sensors 501a-f being in electronic communication with at least one of dedicated processors 503a-f or a central processor 505 installed on the HP. As illustrated in FIG. 5, each image sensor 501a-f is in electronic communication with both the dedicated processor 503a-f and a central processor 505. However, it will be apparent in view of this disclosure that, in accordance with various embodiments, one or more of the image sensors 501a-f may communicate exclusively with the central processor 505. It will further be apparent in view of this disclosure that, in accordance with various embodiments, one or more of the image sensors 501a-f may connect exclusively with one of the dedicated processors 503a-f. It will still further be apparent in view of this disclosure that any combination of sensors per processor or processors per sensor can be used in accordance with various embodiments.

Image sensors 501a-f can be any suitable device such as, for example, but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 501a-f, in accordance with various embodiments can encompass any sensor configured to capture electromagnetic radiation in any spectrum for producing an image, including, for example, infrared radiation, visible light, ultraviolet radiation, x-rays, etc.

Dedicated processors 503a-f and central processor 505 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 503a-f can be a FPGA for providing temporary storage of a limited number of data captures acquired by the corresponding image sensor 501a-f and a coarse initial analysis while the central processor 505 can be a microprocessor for conducting more detailed analysis as needed. In various embodiments, the central processor 505 can perform all processing functions, eliminating the need for dedicated processors 503a-f. In various embodiments, the dedicated processors 503a-f can perform all processing functions, eliminating the need for a central processor 505. It will be apparent in view of this disclosure that any other combinations or ratios of processors and image sensors can be used in accordance with various embodiments.

Figure 6:
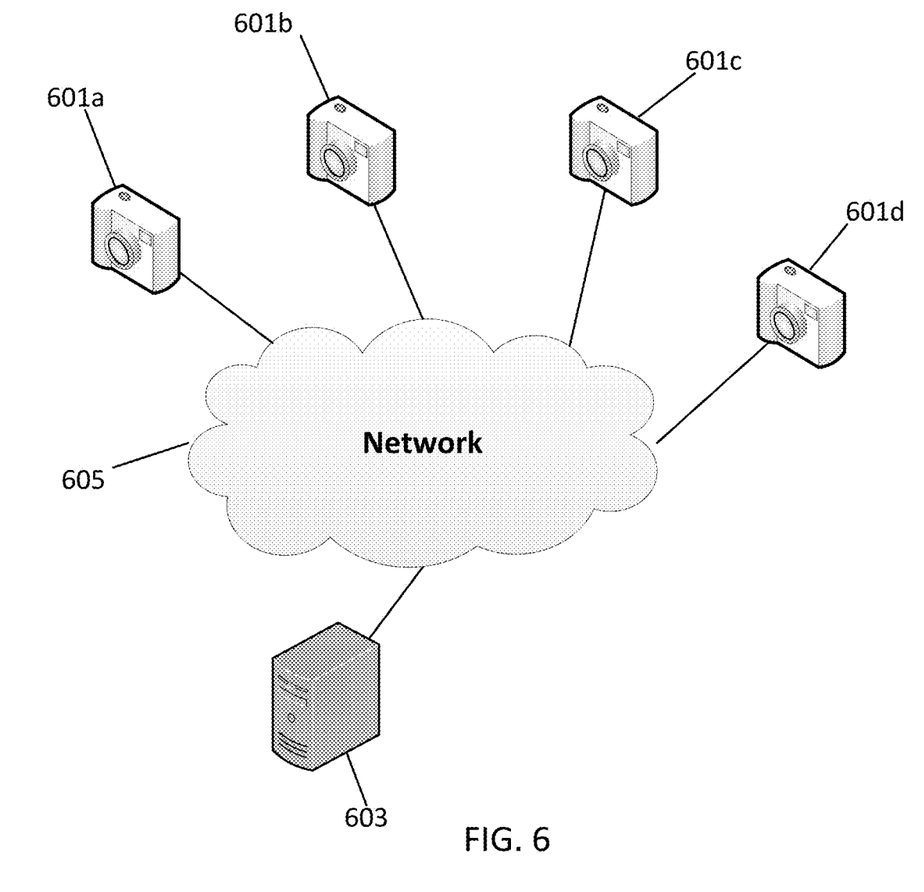
FIG. 6 is an example imaging system block diagram depicting various components which can be used to implement various embodiments in a distributed remote imaging system as taught herein.

FIG. 6 is an example imaging block diagram of certain distributed embodiments. Although FIGS. 1 and 4 and portions of the exemplary discussion above, make reference to a centralized system 100 operating with on one or more co-located image sensors or computing devices, one will recognize that various of the components and modules within the system 100 may instead be distributed across a network 605 in separately or remotely located image sensors 601a-d such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and computing devices 603 such as one or more server systems, desktop computer devices, mobile computer devices, field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 601a-d can be received by the remote computing device(s) 603 for filtered image data recovery. In some embodiments, the remote computing device(s) 603 can provide feedback to one or more of the image sensors 601a-d based on the identification of one or more tracks or an initiation event. In some distributed remote imaging systems, the image sensors 601a-d and computing devices 603 of the system 100 can be separately located and can be in communication with one another across the network 605.

Exemplary Computing Devices

Figure 7:
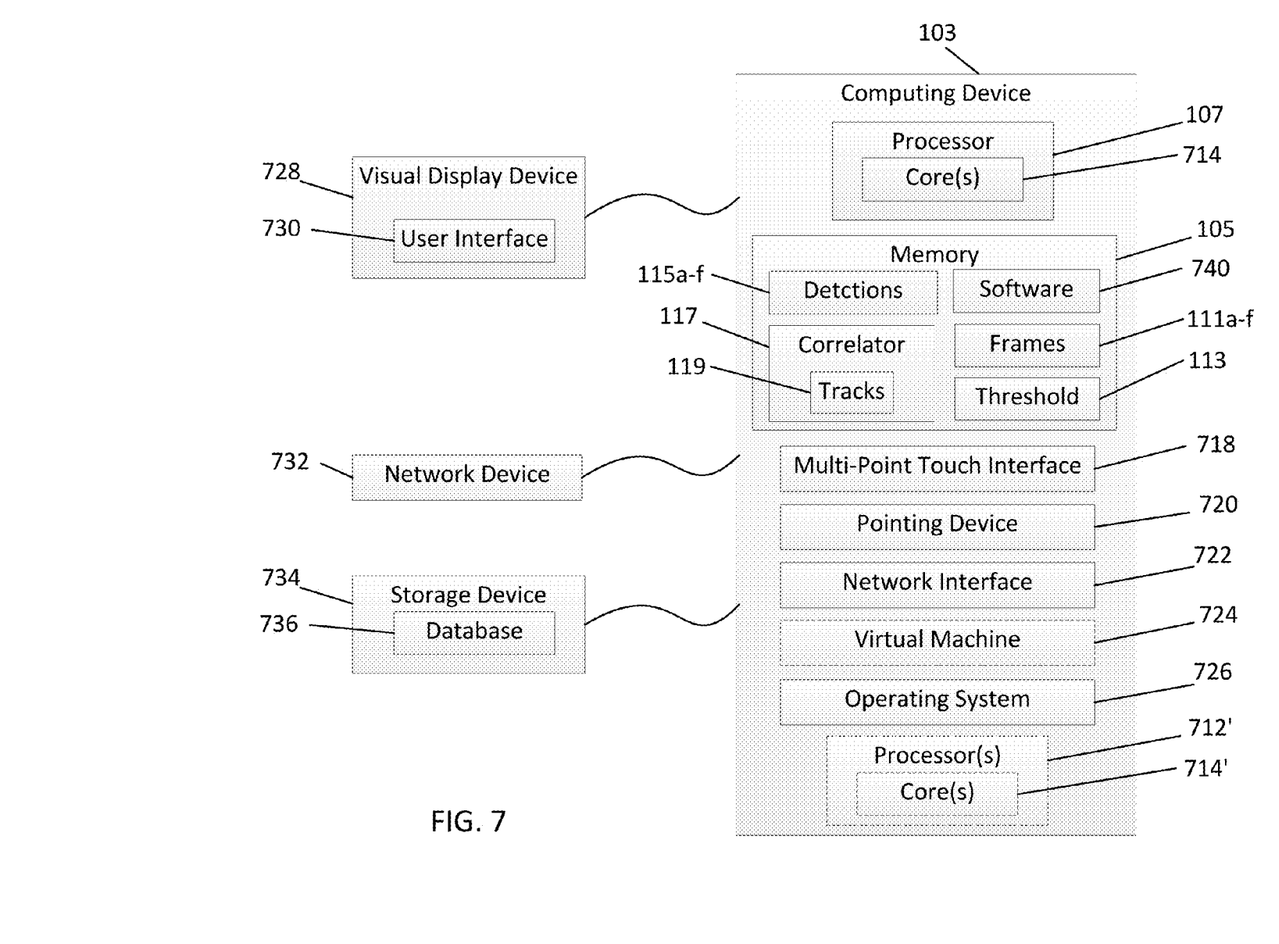
FIG. 7 is an example computational device block diagram depicting various components which can be used to implement various embodiments as taught herein.

FIG. 7 is a block diagram of an exemplary computing device 103 or portions thereof, in accordance with various embodiments and, for clarity, refers back to and provides greater detail regarding various elements of the system 100 of FIG. 1. The computing device 103 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 105 included in the computing device 103 can store computer-readable and computer-executable instructions or software for performing the operations disclosed herein. For example, the memory 105 can store a software application 740 which is configured to perform various of the disclosed operations (e.g., apply the pixel intensity threshold 113 to a plurality of frames 111a-f to identify detections 115a-f and apply the track correlator 117 to the detections 115a-f to identify one or more tracks 1119). The computing device 103 can also include configurable and/or programmable processor 107 and an associated core 714, and optionally, one or more additional configurable and/or programmable processing devices, e.g., processor(s) 712' and associated core(s) 714' (for example, in the case of computational devices having multiple processors/cores), for executing computer-readable and computer-executable instructions or software stored in the memory 105 and other programs for controlling system hardware. Processor 107 and processor(s) 712' can each be a single core processor or multiple core (714 and 714') processor. In some embodiments, processor 107 and processor(s) 712' can each be one or more of a field-programmable gate array, a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 103 so that infrastructure and resources in the computing device can be shared dynamically. A virtual machine 724 can be provided to handle a process running on multiple processors so that the process appears to be using only one computing resource rather than multiple computing resources. Multiple virtual machines can also be used with one processor.

Memory 105 can include a computational device memory or random access memory, such as DRAM, SRAM, EDO RAM, and the like. Memory 105 can also include, for example, flip-flops, memory blocks, RAM blocks, programmable read-only memory, and the like. Memory 105 can include other types of memory as well or combinations thereof.

A user can interact with the computing device 103 through a visual display device 728, such as a computer monitor, which can display one or more user interfaces 730 that can be provided in accordance with exemplary embodiments. The computing device 103 can include other I/O devices for receiving input from a user, for example, a keyboard or any suitable multi-point touch interface 718, or a pointing device 720 (e.g., a mouse). The keyboard 718 and the pointing device 720 can be coupled to the visual display device 728. The computing device 103 can include other suitable conventional I/O peripherals.

The computing device 103 can also include one or more storage devices 734, such as a hard-drive, CD-ROM, or other computer readable media, for storing data and computer-readable instructions and/or software that perform operations disclosed herein. Exemplary storage device 734 can also store one or more databases 736 for storing any suitable information required to implement exemplary embodiments. The databases 736 can be updated manually or automatically at any suitable time to add, delete, and/or update one or more items in the databases.

The computing device 103 can include a network interface 722 configured to interface via one or more network devices 732 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X.25), broadband connections (for example, ISDN, Frame Relay, ATM), wireless connections, controller area network (CAN), or some combination of any or all of the above. The network interface 722 can include a built-in network adapter, network interface card, PCMCIA network card, card bus network adapter, wireless network adapter, USB network adapter, modem or any other device suitable for interfacing the computing device 103 to any type of network capable of communication and performing the operations described herein. Moreover, the computing device 103 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 103 can run any operating system 726, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 726 can be run in native mode or emulated mode. In an exemplary embodiment, the operating system 726 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A method for filtered image data recovery comprising the steps of:
   receiving, at a first computing device having a first memory component and a first processing component, first, second, and third data captures from an image sensor, the first data capture including a first plurality of pixel intensity values, the second data capture including a second plurality of pixel intensity values, and the third data capture including a third plurality of pixel intensity values;
   storing the first, second, and third data captures received from the image sensor in the first memory component;
   receiving, at a second computing device having a second memory component and a second processing component, the first, second, and third data captures from the image sensor;
   storing the first, second, and third data captures received from the image sensor in the second memory component;
   identifying at least a second detection in the second data capture and a third detection in the third data capture by filtering the first, second, and third data captures, the filtering performed using the first processing component to determine at least one of the second plurality of pixel intensity values of the second data capture and at least one of the third plurality of pixel intensity values of the third data capture exceeds a pixel intensity threshold stored in the first memory component;
   correlating, by the first processing component, the second detection and the third detection to identify at least one track; and
   detecting a first detection in the first data capture stored in the second memory component, the detecting performed based on the identification of the at least one track and using the second processing component of the second computing device, the first detection being at least one of a pixel intensity value that is less than the pixel intensity threshold or an initiation event having a pixel intensity value that is less than the pixel intensity threshold.

2. The method of claim 1, wherein the initiation event is at least one of a rocket launch, a muzzle flash, or a missile launch.

3. The method of claim 1, wherein the filtering further comprises:
   erasing, from the first memory component, pixel intensity values in the first, second, and third data captures that are less than the pixel intensity threshold.

4. The method of claim 1, wherein at least one of the first computing device or the second computing device is a field-programmable gate array.

5. The method of claim 1, wherein at least one of the first processing component of the first computing device or the second processing component of the second computing device is a microprocessor.

6. The method of claim 1, wherein the image sensor, the first computing device, and the second computing device are installed on a common mobile host platform.

7. The method of claim 1, wherein at least one of the first computing device or the second computing device is located remotely from the image sensor and in electronic communication with the image sensor via a communications network.

8. An imaging system comprising:
   an image sensor configured to capture image data;
   a first computing device in electronic communication with the image sensor having a first memory component and a first processing component, the first memory component including instructions that, when executed by the first processing component, cause the first computing device to:
      receive first, second, and third data captures from the image sensor, the first data capture including a first plurality of pixel intensity values, the second data capture including a second plurality of pixel intensity values, and the third data capture including a third plurality of pixel intensity values,
      store the first, second, and third data captures received from the image sensor in the first memory component,
      identify at least a second detection in the second data capture and a third detection in the third data capture by filtering the first, second, and third data captures, the filtering performed using the first processing component to determine at least one of the second plurality of pixel intensity values of the second data capture and at least one of the third plurality of pixel intensity values of the third data capture exceeds a pixel intensity threshold stored in the first memory component, and
      correlate, by the first processing component, the second detection and the third detection to identify at least one track; and
   a second computing device in electronic communication with the image sensor and the first computing device having a second memory component and a second processing component, the second memory component including instructions that, when executed by the second processing component, cause the second computing device to:
      receive the first, second, and third data captures from the image sensor;
      store the first, second, and third data captures received from the image sensor in the second memory component;
      detect a first detection in the first data capture stored in the second memory component, the detecting performed based on the identification of the at least one track and using the second processing component of the second computing device, the first detection being at least one of a pixel intensity value that is less than the pixel intensity threshold or an initiation event having a pixel intensity value that is less than the pixel intensity threshold.

9. The system of claim 8, wherein the initiation event is at least one of a rocket launch, a muzzle flash, or a missile launch.

10. The system of claim 8, the first memory component further including instructions that, when executed by the first processing component, cause the first computing device to erase, from the first memory component, pixel intensity values in the first, second, and third data captures that are less than the pixel intensity threshold.

11. The system of claim 8, wherein at least one of the first computing device or the second computing device is a field-programmable gate array.

12. The system of claim 8, wherein at least one of the first processing component of the first computing device or the second processing component of the second computing device is a microprocessor.

13. The system of claim 8, wherein the image sensor, the first computing device, and the second computing device are installed on a common mobile host platform.

14. The system of claim 8, wherein at least one of the first computing device or the second computing device is located remotely from the image sensor and in electronic communication with the image sensor via a communications network.

15. The system of claim 8, wherein:
the image sensor is one of a plurality of image sensors installed on a common host platform, each of the image sensors configured to capture image data;
the first computing device is one of a plurality of dedicated computing devices installed on the common host platform, each of the dedicated computing devices in electronic communication with a corresponding one of the image sensors and having a dedicated memory component and a dedicated processing component; and
the second computing device is a central computing device in electronic communication with each of the plurality of dedicated computing devices.

16. An imaging system comprising:
an image sensor configured to capture image data;
a computing device in electronic communication with the image sensor having first and second memory components and a processing component, the first memory component including instructions that, when executed by the processing component, cause the computing device to:
receive first, second, and third data captures from the image sensor, the first data capture including a first plurality of pixel intensity values, the second data capture including a second plurality of pixel intensity values, and the third data capture including a third plurality of pixel intensity values,
store the first, second, and third data captures received from the image sensor in the first memory component,
store the first, second, and third data captures received from the image sensor in the second memory component;
identify at least a second detection in the second data capture and a third detection in the third data capture by filtering the first, second, and third data captures, the filtering performed using the processing component to determine at least one of the second plurality of pixel intensity values of the second data capture and at least one of the third plurality of pixel intensity values of the third data capture exceeds a pixel intensity threshold stored in the first memory component,
correlate the second detection and the third detection to identify at least one track; and
detect a first detection in the first data capture stored in the second memory component, the detecting performed based on the identification of the at least one track, the first detection being at least one of a pixel intensity value that is less than the pixel intensity threshold or an initiation event having a pixel intensity value that is less than the pixel intensity threshold.

17. The system of claim 16, the first memory component further including instructions that, when executed by the first processing component, cause the computing device to erase, from the first memory component, pixel intensity values in the first, second, and third data captures that are less than the pixel intensity threshold.

18. The system of claim 16, wherein the image sensor, the first computing device, and the second computing device are installed on a common mobile host platform.

19. The system of claim 16, wherein at least one of the first computing device or the second computing device is located remotely from the image sensor and in electronic communication with the image sensor via a communications network.

20. The system of claim 16, wherein:
the image sensor is one of a plurality of image sensors installed on a common host platform, each of the image sensors configured to capture image data;
the computing device is one of a plurality of dedicated computing devices installed on the common host platform, each of the dedicated computing devices in electronic communication with a corresponding one of the image sensors and having a dedicated memory component and a dedicated processing component.

* * * * *